Figure 1:
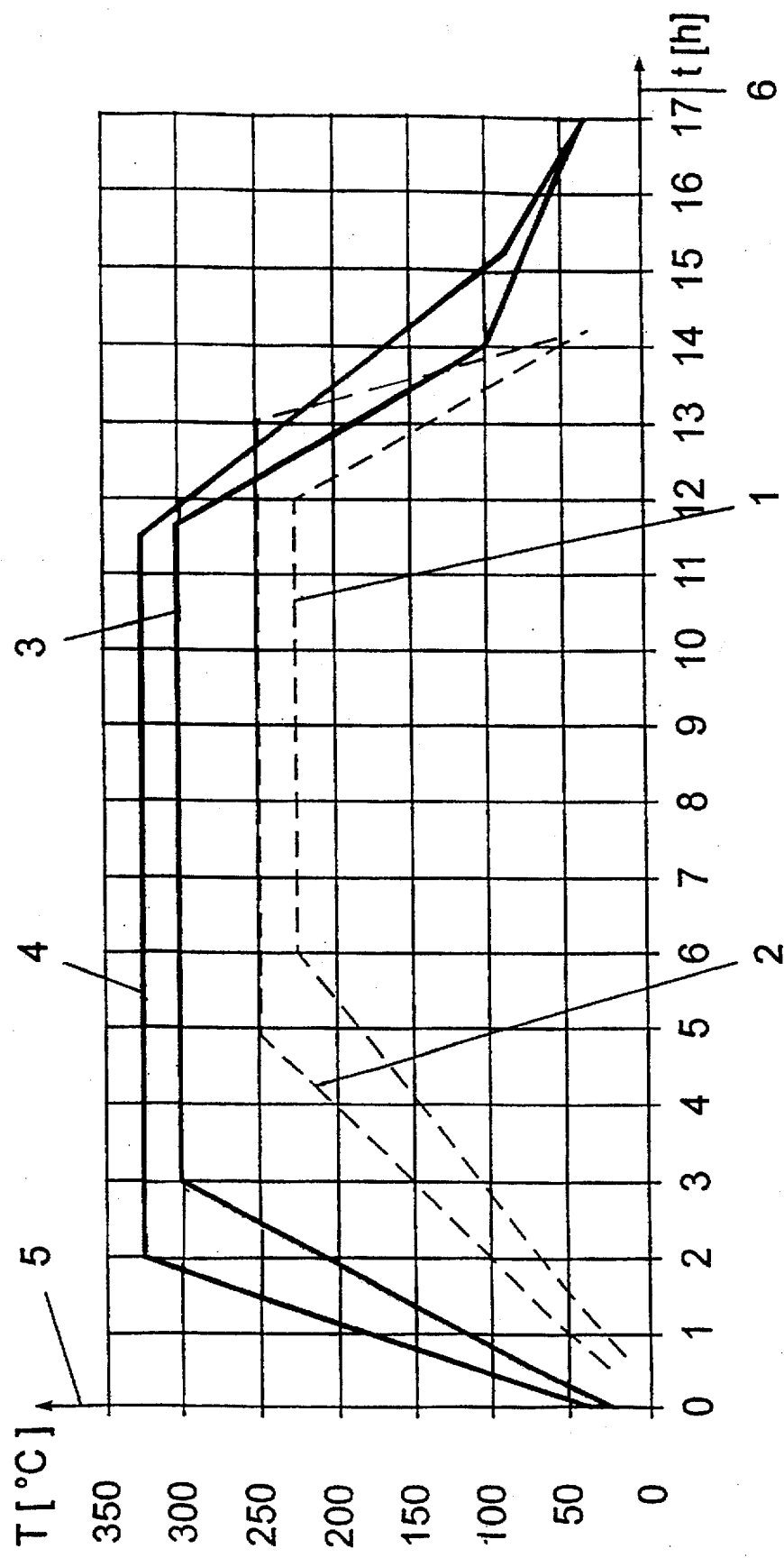

United States Patent [19]
Seidel et al.

[11] Patent Number: 5,676,722
[45] Date of Patent: Oct. 14, 1997

[54] METHOD FOR PRODUCING FLAT OR ARCUATE GLASS PLATES

[75] Inventors: Horst Seidel, Walchwil; Chrisoph Schmalt, Egg/ZH, both of Switzerland

[73] Assignee: Vetrotech AG, Walchwil, Switzerland

[21] Appl. No.: 601,016

[22] Filed: Feb. 23, 1996

[30] Foreign Application Priority Data

Jul. 8, 1994 [CH] Switzerland .................. 2184/94

[51] Int. Cl.$^6$ .............. C03C 15/00; C03B 31/00; C03B 32/00; C03B 27/00
[52] U.S. Cl. .............. 65/111; 65/30.14; 65/104; 65/114
[58] Field of Search .................. 65/30.14, 104, 65/114, 30.1, 111

[56] References Cited

U.S. PATENT DOCUMENTS

| | | | |
|---|---|---|---|
| 3,287,200 | 11/1966 | Hess et al. | |
| 3,356,477 | 12/1967 | Chisholm et al. | 65/30 |
| 3,460,927 | 8/1969 | Fischer et al. | 65/30 |
| 3,650,719 | 3/1972 | Van Laethem | 65/30 |
| 4,172,921 | 10/1979 | Kiefer | 428/410 |
| 4,416,930 | 11/1983 | Kelly | 428/137 |
| 4,846,868 | 7/1989 | Aratani | 65/30.14 |

FOREIGN PATENT DOCUMENTS

WO9325487  12/1993  WIPO.

*Primary Examiner*—Donald E. Czaja
*Assistant Examiner*—Jacqueline A. Ruller
*Attorney, Agent, or Firm*—Notaro & Michalos P.C.

[57] ABSTRACT

Glass plates are thermally or chemically tempered to increase flexural bending strength. The tempered plates are subsequently subjected to a heat treatment in order to lower the possibility of spontaneous breakage of the glass plates. According to the method according to the invention the glass plates are tempered at least twice and again heat-treated. At least the second heat treatment takes place at higher temperatures than were used previously. The treated glass plates have increased flexural bending strength and reduced tendency to spontaneous breakage.

16 Claims, 1 Drawing Sheet

METHOD FOR PRODUCING FLAT OR ARCUATE GLASS PLATES

The invention relates to a method for producing flat or arcuate glass plates with high flexural bending strength in which the glass plates are first thermally or chemically tempered, subsequently heat treatment at a temperature below the transformation temperature of glass is carried out, and to the application of the method in the production of safety and fire-protection safety glazing.

Glass plates of this type are used as facing, as tempered glass panes in windows or doors, and also as parts of transparent structural elements forming partitions, for example walls of rooms. The glass plates are used therein in known manner as individual panes or in compound arrangements with several panes as composite or insulating glazings. In all applications in which relatively high mechanical or thermal stability of the glass is required it is necessary to temper the glass plates. Such tempering methods are known with thermal tempering being described for example in DE 36 11 844 C2. In safety glazings tempering effects higher strength against breaking and, in the event of a potential pane breakage, a reduction of the risk of injury. With fire-protection glazings the higher strength achieved through tempering leads to an increase of the temperature fatigue strength and therewith higher safety in the event of fire if the glass pane is partially heated. It is known to use for such glazings alumosilicate glass, borosilicate glass or soda-lime glass. Since by means of tempering for various applications the mechanical strength obtained is not sufficient, additional measures must be taken by combining individual glass plates to form compound glasses as is known for example from EP-0 219 801-B1, or specific frame profiles and sealing materials are used, such as are described for example in CH-658 099-A5 or in a combination of the cited technologies, for example in EP-0 528 781-A1. These additional measures are necessary in particular with fire-protection glazings in order to achieve at constant temperature fatigue strength minimum temperature differences within the glass pane. It is known that temperature fatigue strength is the measure of the maximum permissible temperature difference within a glass pane.

But it is known from practice that even when all of these known technologies are already applied during production spontaneous breakage occurs in the case of glazings with tempered glass plates or after a short or relatively long time. This is described in the publication Schweizer Aluminium Rundschau 12/1972 p. 383 ff. From this publication and from practice it is known that the number of spontaneous breakages can be reduced if after the tempering procedure the tempered glass panes are subjected to a heat treatment, a so-called hot storage test, called in general "heat soak test". For example in order to generate the tempering during the production process, glazings of soda-lime glass are heated to temperatures between 500° and 700° C. as a function of the glass composition and subsequently the two outer faces of a pane are rapidly cooled, for example with cold air. The glass pane tempered in this way is subsequently subjected to the "heat soak test" by heating it for approximately three hours at 240° C. As described above, those panes are destroyed during this heat treatment which contain nickel sulfide inclusions. For the heat treatment or the "heat soak test", temperatures of approximately 250° C. are normally used since at higher temperatures the tempering of the glass is markedly impaired. The application of temperatures up to maximally 290° C. has already been suggested, however, due to the reduction of the tempering, and therewith the reduction of the temperature fatigue strength, has found only limited use in practice. Already at heat treatment temperatures below 250° C. a reduction of the tempering generated in the glass pane in the preceding process step occurs. However, this reduction is accepted in view of the reduction of the number of later spontaneous breaks. Avoiding spontaneous breaks is of great importance especially in the construction of facings.

Instead of thermal processes, the glass plates can also be tempered by using known chemical processes. In these processes an ion exchange is effected in the glass surface, which places the glass surface under pressure. The process of chemical tempering is rarely applied in the case of plate glass since it is expensive and the tempered surface layer is relatively thin.

Especially high demands are made of fire-protection glazings in which for their use in buildings test regulations and standards exist which must be met. One of them is, for example, the known country standards or the Europanormen {European standards} prEN/EN 648, 571 and 573. In order to meet the flame resistance times demanded here of, for example, 30, 45, 60 or 90 minutes in the corresponding safety classes, the above described known measures such as tempering the glass plate, building compound glasses and mounting in specially implemented frames are combined. Because of the relatively low flexural bending strength of the tempered glass plates complex and expensive combinations and in particular expensive frame mountings are necessary in order to achieve the requisite resistance times. In spite of the tempering and the subsequent "heat soak test" heat treatment, after performing the tests or the heat treatment, in practice spontaneous breakage still occurs in glazings when applying such glass panes. A breakage rate of approximately 5% during the first ten minutes of all glasses used in fire tests and events of fire of corresponding glazings would be desirable, however, this cannot be ensured given current known solutions.

The present invention therefore addresses the problem of creating a method for producing glass plates which have a higher flexural bending strength and which also leads to increased temperature fatigue strength. Simultaneously, the method is to ensure that the probability of spontaneous breakages is reduced. When using identical types of glass and/or identical pane constructions, and/or identical mountings in frames, higher resistance times in the event of fire and generally greater safety against breakage is to be attained. The method is to be applicable to borosilicate glasses and to soda-lime glasses.

The process of the invention overcomes the known problems and is described in more detail below and in the claims forming a part of this disclosure.

In the method according to the invention a glass plate is initially thermally or chemically tempered in known manner, subsequently subjected to heat treatment and the glass plates which tolerate the heat treatment without being damaged are again chemcially or thermally tempered in an additional process step. Each glass plate is at least tempered twice in successive process steps and between each tempering process a heat treatment is applied. All glasses are suitable as starting material for the glass plates which have a linear coefficient of thermal expansion $\alpha$ in the range of 3.0 to $9.5 \times 10^{-6}$ $K^{-1}$ and a modulus of elasticity E in the range of 6.0 to $9.0 \times 10^4$ $N/mm^2$. The application is directed to the production of glasses which, after the production process, comprise inclusions, for example in the form of nickel sulfide or other inhomogeneities, such as fine foreign crystals, cracks, bubbles or streaks. A significant advantage of the method according to the invention resides therein that the heat treatment can be carried out at higher temperatures and the degradation of flexural bending strength generated at the higher temperatures can be compensated through the additional process step of the succeeding second tempering. The heat treatment at higher temperatures permits discarding a greater number of glass plates with inclusions or inhomogeneities and therewith a considerable reduction of the danger of later spontaneous breakages is attained. It was also surprisingly found that when applying a second tempering procedure after the heat treatment higher flexural bending strength can be attained and thus the temperature fatigue strength of the glasses treated with the method according to the invention is also correspondingly higher. If commercially available soda-lime glasses are thermally tempered according to, for example, previously known methods and subsequently subjected to a heat treatment within the scope of "heat soak tests", an average flexural bending strength of 120–150 $N/mm^2$ is determined in the glass plates not destroyed during the test. The thermal tempering takes place during the heating to a temperature between 600°–850° C. and subsequent cooling. When applying the method according to the invention with, for example, two tempering processes and heat treatment between and after them, the glass plates not destroyed show a flexural bending strength of approximately 180 $N/mm^2$ at a minimum and on the average approximately 207 $N/mm^2$. The residual probability that the glass plates are later destroyed through spontaneous breakages is considerably reduced through the application of a higher temperature during the heat treatment phase, and a failure probability is attained of less than 5% during the first ten minutes after a fire. The heat treatment between the two tempering processes takes place at temperatures above 300° C. The glass plates are exposed for example at a temperature of 310°±10° C. to this temperature for at least two hours, on the average for approximately 9 hours. The level of the heat treatment temperature and the duration of the treatment is determined by the composition of the glass and to some extent by the desired safety standard. When applying the heat treatment according to the invention not only those glass plates are detected which contain nickel sulfide inclusions but also those with other inhomogeneities since these glass plates are destroyed during the heat treatment, eliminated from the fabrication process and discarded. The method according to the invention has furthermore the advantage that the thermal tempering can take place in the known temperature range i.e. by heating to a temperature in the range between transformation temperature and melting temperature of the corresponding type of glass and subsequent cooling. According to the general state of the art it is expected that greater hardening or strengths of the glass can be attained if this is brought to a higher temperature level and is cooled correspondingly more strongly. However, with the method according to the invention this is not necessary; the same temperatures can be used for the tempering processes as are used in the previously known processes and yet values for the flexural bending strength are attained which are at least 25% or more above the values reached with previous methods.

When applying the method according to the invention further advantages result if glasses having a maximum iron oxide $Fe_2O_3$ content of 0.02 percent by weight are used as the glass plates. The content of other coloring oxides is usefully restricted to a maximum of 0.01 percent by weight. Glasses of this type are heated less rapidly by heat radiation and have per se better temperature fatigue strength or a higher coefficient of thermal expansion than glass having a higher iron oxide content or containing other oxides, in particular metal oxides. Consequently, the higher flexural bending strength of the glasses targeted, and also attained, by the method according to the invention can be optimized. Thereby that the glass plates are colored at least in their surface region or throughout with colored oxides, or are provided at least on one side with a coating, advantages result due to the influence of the light and/or heat transparency of the glass plates. This allows the glass plates treated according to the invention to be adapted to specific application purposes, for example, if reduced transmission of sun rays or increased reflection of heat radiation is desired. To increase the reflection on at least one side of the glass plate it is advantageous to apply a coating having an emissivity of at least 4%. According to the definition in the European Standard prEN 673 by emissivity or also emissive power is understood the radiative reflected energy fraction.

In the case of glass plates having a surface coating it is advantageous to remove this coating in the form of strips along the edges. The width of these strips measured from the edge at approximately right angles toward the center region of the plate, is at least 5 mm. The removal of the coating yields an improvement of the heat transmission in the region of the edge frame of glazings. For example in case of fire, the temperature difference between the edge regions and the center region of a glass plate is thus reduced and, consequently, also the danger of breakage. It is advisable to remove as much of the coating on the glazing as is covered by the frame profile. This width corresponds thus at least to the length of the glass (GE) projection into the frame profile of the glazing.

Since, when cutting the glass plates to size, irregularities and hairline fractures are generated at the edges and in the edge region, the glass plates which are used for safety and/or fire protection glazing are reworked in the edge region. This reworking takes place by grinding and/or polishing and is carried out for the purpose of removing the irregularities and hairline fractures. In the method according to the invention this reworking takes place before the first method step, namely the first tempering process and the reworking of the edge regions or the edges taking place according to the invention with grinding devices which generate on the surface of the glass plate a minimum contact pressure of 2.5 bars. During the reworking the glass plate is simultaneously moved past the reworking tools at a minimum advance speed of 1.7 m/min. Water without grinding allowances is used can be recovered in simple manner and no waste products accumulate which might be difficult to dispose of and no expenses for additional grinding allowances result. With the given combination of using water as the grinding fluid and the minimum advance speeds and contact pressures, a better quality of the edge regions results compared to the previously used reworking methods leading to an additional reduction of the breakage probability of glass plates treated with the method according to the invention.

Particular advantages are obtained when using the method according to the invention or the glass plates produced according to the invention for the production of fire-protection glazings or single-pane safety glazings or compound safety glazings. Such glazings comprise at least one glass plate. To attain higher safety or resistance values, several glass plates are combined to form a composite in which, in known manner, they are in direct contact or are disposed at intervals one from the other and, if necessary, are also combined with additional protective layers comprising other materials. These glazings have edge regions which are held in a mounting frame or cooperate with mountings. The use of glass plates according to the invention yields also in the production of such glazings a considerable reduction of the danger of spontaneous breakages, an increase of the breakage resistance and considerable improvement of the temperature fatigue strength. In case of fire the glazings according to the invention have better resistance times and can be assigned higher safety classifications.

In the following the invention will be explained in further detail in conjunction with embodiment examples and with reference to the attached drawing. Therein depict:

FIG. 1 a temperature/time diagram with the course of the heat treatment.

FIG. 1 depicts in a temperature/time diagram the course of the heat treatment of glass plates in the known "heat soak test" and with the method according to the invention. On the abscissa 5 the temperature is plotted in °C. and on the ordinate 6, the time in hours. Curves 1 and 2 indicate the range past in a "heat soak test" according to the state of the art. This is the range which is enclosed between the two curves 1 and 2. The range enclosed between curves 3 and 4 of the diagram describes the course of a heat treatment method according to the invention. A heating phase is followed by a holding phase and, subsequently, by a cooling phase. With the traditional "heat soak test" maximum temperatures of 250° C. are normally used in the holding phase. In comparison, in the example shown for the method according to the invention, the heat treatment during the holding phase is kept in a range of, for example, 300° to 320° C. and is applied over a holding time of nearly 9 hours.

The advantages of the method according to the invention can be illustrated in conjunction with the following examples in comparison with the state of the art. Glass plates are produced according to four different methods, subsequently the flexural bending strength is determined and the breakage of the glass plates produced by different methods is determined in a fire test. For all four examples 6 mm thick soda-lime glass panes (float glass) are used.

EXAMPLE 1

In a manner known per se 15 panes with the dimensions 360 mm×1100 mm are cut from a glass board of 3.20 m×6.00 m with a thickness of 6 mm. The edges are ground and polished and the panes washed and thermally tempererd under the following conditions: furnace temperature=680° C., dwelling time=100 seconds, quenching time=100 seconds. The mean flexural bending strength ($\sigma_{BZ}$) measured on ten selected tempered panes is 135 N/mm². Tempering takes place in known manner in a tempering furnace of conventional construction.

EXAMPLE 2

From a glass board of 3.20 m×6.00 m with a thickness of 6 mm again 15 panes having the dimensions 360 mm×1100 mm are cut. The edges are ground and polished and the panes washed and thermally tempered under the following conditions: furnace temperature=690° C., dwelling time= 111 seconds, quenching time=111 seconds.

In known manner, the 15 tempered panes are subsequently subjected to the "heat soak test" (HST) shown in FIG. 1 according to the temperature/time field between lines 1 and 2. One pane was destroyed in the course of the "heat soak test". The mean flexural bending strength ($\sigma_{BZ}$) measured on ten selected panes is 148 N/mm².

EXAMPLE 3

From a 3.20 m×6.00 m glass board having a thickness of 6 mm here also panes having the dimensions 360 mm×1100 mm were cut. The edges were ground and polished and the panes were washed and thermally tempered under the following conditions: furnace temperature=690° C., dwelling time=111 seconds, quenching time=111 seconds.

The 15 tempered panes were subsequently subjected to heat treatment at a higher temperature level corresponding to the temperature/time field shown between lines 3 and 4 in FIG. 1. Three panes were destroyed in the course of the heat treatment. The mean flexural bending strength ($\sigma_{BZ}$) measured on ten selected panes was now only 140 N/mm².

EXAMPLE 4

This example concerns glass plates produced with the method according to the invention. For this purpose, from a glass board of 3.20 m×6.00 m with a thickness of 6 mm 15 panes having the dimensions 360 mm×1100 mm were cut. The edges were ground and polished and the panes washed and thermally tempered under the following conditions: furnace temperature=690° C., dwelling time=111 seconds, quenching time=111 seconds.

The 15 tempered glass plates were subsequently subjected to the heat treatment according to the invention, corresponding to the temperature/time field between lines 3 and 4 in FIG. 1. During this heat treatment four glass plates were destroyed. The eleven intact glass plates were then tempered a second time and specifically under the following conditions: temperature=690° C., dwelling time=111 seconds, quenching time=111 seconds.

The mean flexural bending strength ($\sigma_{BZ}$) measured on ten selected panes is 207 N/mm².

For the subsequent fire testing five glass panes, produced according to the four production methods according to examples 1 to 4, having the dimensions 1200 mm×2000 mm with a thickness of 6 mm were produced. These panes were set into a mounting frame with identical steel profiles and a constant projection length of the glass into the frame (GE) of 12±1 mm and the fire tests were subsequently carried out in a manner known per se. The result of these fire tests was as follows: of each of the five panes four panes produced according to example 1 broke during the tests in the first five minutes, of the panes produced according to example 2 three, of the panes produced according to example 3 also three, however, of the panes produced according to example 4 not one broke.

The low values of the mean flexural bending strength measured with example 1 can be traced back to the fact that in the selected quantity of glass plates all plates with defects are contained. These break at considerably lower load and because of this the mean value is also lower than for plates according to example 2.

The profile of the mean flexural bending strength ($\sigma_{BZ}$) over examples 2 and 3 shows clearly that the flexural bending strength is degraded through the heat treatment or the "heat soak test". When carrying out a "heat soak test" at increased temperature levels more plates break during the tests than in example 2 and the flexural bending strength of the remaining intact glasses is simultaneously considerably reduced. For this reason temperatures above 250° C. were normally not used in the past. In contrast, comparison of the results of example 4 with the results of examples 1 to 3 indicate clearly that the glass plates or panes produced with the method according to the invention according to example 4 have the highest flexural bending strength values ($\sigma_{BZ}$) with maximum elimination of the inhomogeneities present in the interior of the glass. Still more marked is the significant improvement and superiority of the method according to the invention by comparison with the fire tests carried out on the glass plate panes produced according to examples 1 to 4. The glass plates produced according to the invention, as a consequence of the considerably higher flexural bending strength, also have considerably higher temperature fatigue strength. This alone represents a remarkable improvement of the resistance to fracture, their tensile strength, and temperature resistance. Through the additional elimination of glass plates with inhomogeneities the failure probability is further reduced. Therefore glass plates and glazings produced with the method according to the invention can also tolerate considerably higher loading.

Further advantages of the method according to the invention for the production of thermally temperable and mechanically high-strength glasses with high flexural bending strengths ($\sigma_{BZ}$) reside in the simple design, layout and implementation of the production or process steps and the high reproducibility, in comparison to conventional methods, with respect to flexural bending strength ($\sigma_{BZ}$) and temperature fatigue strength (TWF). This leads to the fact that glass panes produced according to the present invention can be conventionally, and therefore economically, installed and the failure probability of the glass panes, i.e. the feared breakage in the first ten minutes in standard fire tests and during fires is in the proximity of 5% or less.

We claim:

1. A method for the production of a plane or arcuate glass plate with high flexural bending strength with the glass plate first being thermally or chemically tempered and followed by a heat treatment at a temperature level below the transformation temperature of the glass being carried out, comprising the steps of:

(a) first thermally or chemically tempering the glass plate;

(b) thereafter applying a heat treatment including a heating phase, a holding phase, and a cooling phase to the glass plate to form a heat treated glass plate; and (c) after step (b), thermally or chemically tempering the heat treated glass plate.

2. The method as claimed in claim 1, including repeating steps (b) and (c) at least once.

3. The method as claimed in one of claims 1 or 2, wherein the thermal tempering following applying the heat treatment is carried out at a different maximum temperature from a previous thermal tempering.

4. The method as claimed in one of claims 1 or 2, wherein the holding phase of the heat treatment is carried out at a holding temperature of at least 300° C.

5. The method as claimed in one of claims 1 or 2, wherein after the first tempering, a first heat treatment is carried out at a first holding temperature of less than 280° C., and between two successive temperings following the first heat treatment, a second heat treatment is carried out at a second holding temperature of at least 300° C.

6. The method as claimed in one of claims 1 or 2, wherein the holding phase of each heat treatment is carried out for between two hours and ten hours.

7. The method as claimed in one of claims 1 or 2, wherein during the thermal tempering the glass plate is heated to a temperature in the range of between 600° C. and 850° C. and subsequently cooled.

8. The method as claimed in one of claims 1 or 2, wherein the glass plate has a linear coefficient of thermal expansion $\alpha$ of between $3.0 \times 10^{-6}$ $K^{-1}$ and $9.5 \times 10^{-6}$ $K^{-1}$, and a modulus of elasticity E of between $6.0 \times 10^4$ N/mm$^2$ and $9.0 \times 10^4$ N/mm$^2$ at temperatures between 20° C. and 300° C.

9. The method as claimed in one of claims 1 or 2, wherein the glass plate has a maximum iron oxide ($Fe_2O_3$) content 0.02 percent by weight and a maximum content of other coloring oxides of 0.01 percent by weight.

10. The method as claimed in one of claims 1 or 2, wherein the glass plate is colored with coloring oxides in at least a surface region of the glass plate.

11. The method as claimed in one of claims 1 or 2, wherein a coating having an emissivity of at least 4% is applied to at least one side of the glass plate.

12. The method as claimed in one of claims 1 or 2, wherein a coating having an emissivity of at least 4% is applied to at least one side of the glass plate excluding a region at least 5 mm wide extending from an edge of the glass plate toward a center of the glass plate.

13. The method as claimed in one of claims 1 or 2, wherein before the first tempering, the edges of the glass plate are worked by grinding and/or polishing.

14. The method as claimed in one of claims 1 or 2, wherein before the first tempering, the edges of the glass plate are worked by grinding and/or polishing, and a grinding fluid for working the edges is water.

15. The method as claimed in one of claims 1 or 2, wherein before the first tempering, the edges of the glass plate are worked by grinding and/or polishing, and the glass plate is moved past a working tool at an advance speed of at least 1.7 m/min.

16. The method as claimed in one of claims 1 or 2, wherein before the first tempering, the edges of the glass plate are worked by grinding and/or polishing, and the contact pressure of a working tool on a surface of the glass plate is set at 2.5 bars.

* * * * *